UNITED STATES PATENT OFFICE.

LUDWIG KNORR, OF JENA, GERMANY, ASSIGNOR TO THE FARBWERKE, VORMALS MEISTER, LUCIUS & BRÜNING, OF HÖCHST-ON-THE-MAIN, GERMANY.

NAPHTHALANMORPHOLIN.

SPECIFICATION forming part of Letters Patent No. 641,870, dated January 23, 1900.

Application filed February 4, 1899. Serial No. 704,452. (Specimens.)

*To all whom it may concern:*

Be it known that I, LUDWIG KNORR, Ph. D., professor of chemistry, a citizen of the Empire of Germany, residing at Jena, Germany, have invented certain new and useful Improvements in the Manufacture of Naphthalanmorpholins, of which the following is a specification.

I have found that by the action of ethanolamins upon dihydronaphthalene oxid and subsequent heating of the ethanolamidotetrahydronaphthol thus obtained, corresponding to the general formula

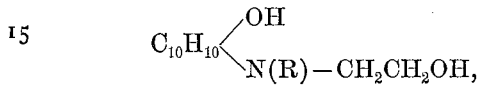

("R" representing a monovalent alcoholic radical,) with acids, new compounds may be obtained, which are to be called "naphthalanmorpholins," having the constitution of

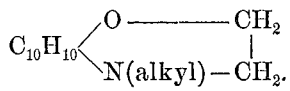

These new compounds are valuable, as they possess the action of morphin, and may thus be employed as its substitute.

I illustrate my process by the following example: One hundred and forty-six parts, by weight, of dihydronaphthalene oxid and ninety parts, by weight, of ethylethanolamin are heated for some hours to 100° to 150° centigrade, when the ethylethanol-amidotetrahydronaphthol thus obtained is separated from the product of reaction by means of alkali. An isolation, however, is unnecessary, and in order to transform it into the corresponding ethylnaphthalanmorpholin the product of reaction is heated directly with five to ten times the quantity of sulfuric acid of sixty to seventy per cent. strength to 140° to 170° centigrade. The acid solution is then diluted with water and the naphthalene thus formed and the unchanged dihydronaphthalene oxid removed by distillation with water. Then alkali is added and the morpholin is dissolved by shaking with ether. Ethylnaphthalanmorpholin is an oil distilling at 320° centigrade; its chlorhydrate crystallizes in prisms from alcohol; its aqueous solution reacts in a neutral manner, and it melts at 237° to 238° centigrade. The base is easily soluble in alcohol, ether, and benzene, and soluble with difficulty in water.

In a corresponding manner analogously-constituted bases—such as naphthalanmorpholin, methylnaphthalanmorpholin, and ethanolnaphthalanmorpholin—may be obtained in employing ethanolamin, methylethanolamin, and diethanolamin instead of ethylethanolamin.

Having now described my invention, what I claim is—

1. As new products the naphthalanmorpholins of the general formula:

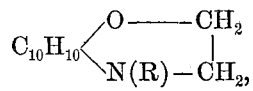

being basic compounds which combine with acids to crystalline salts soluble in water with a neutral reaction, colorless and easily soluble in alcohol, ether, benzene and soluble with difficulty in water.

2. As a new product the ethylnaphthalanmorpholin, being a thick oil, distilling at 320° centigrade, forming a chlorhydrate crystallizing in prisms, melting at 237° to 238° centigrade, soluble in water with a neutral reaction, the oil is easily soluble in alcohol, ether, benzene and soluble with difficulty in water.

In testimony that I claim the foregoing as my invention I have signed my name in presence of two subscribing witnesses.

LUDWIG KNORR.

Witnesses:
ELISABETH KNORR,
T. E. MOORE.